Feb. 21, 1933.  F. G. FOX  1,898,008
ARM SUPPORT FOR AUTO RUMBLE SEATS
Filed July 29, 1931
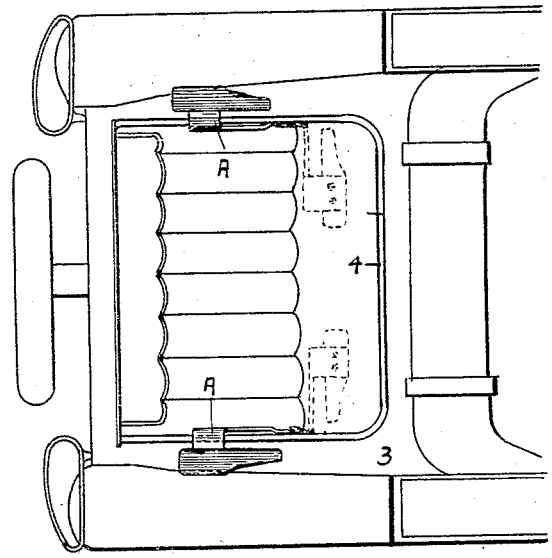
FIG. 1
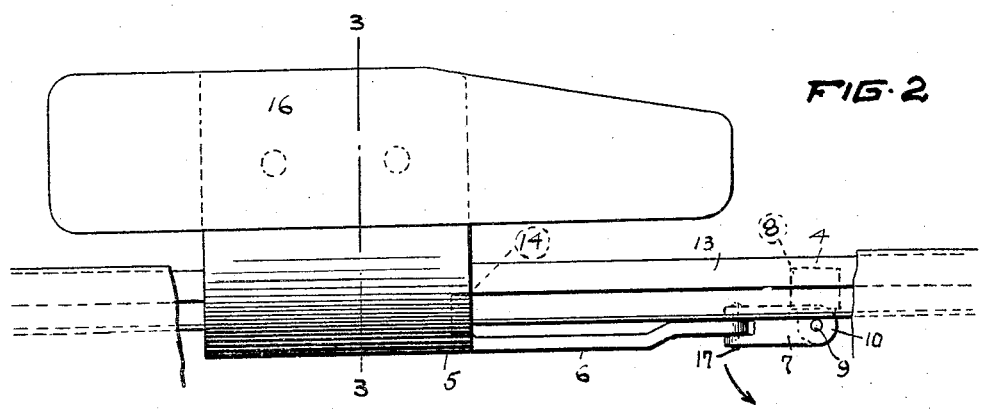
FIG. 2
FIG. 3
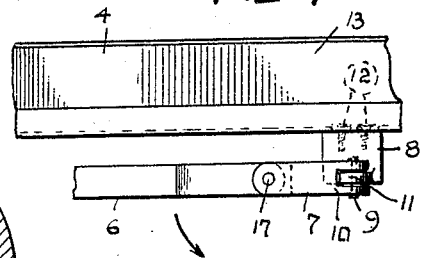
FIG. 4
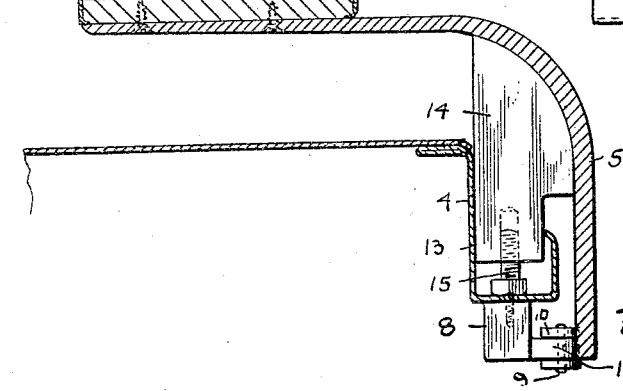
INVENTOR
FRED G. FOX
Fisher, Moser & Moore
ATTORNEY Patented Feb. 21, 1933

1,898,008

UNITED STATES PATENT OFFICE

FRED G. FOX, OF CORTLAND, OHIO

ARM SUPPORT FOR AUTO RUMBLE SEATS

Application filed July 29, 1931. Serial No. 553,792.

My invention relates to arm rests and more particularly to a device of this character especially adapted for attachment to the rumble seat of an automobile.

The general object of the invention is to provide an arm rest which can be conveniently attached to the customary rain channel of a rumble seat and as easily detached therefrom.

Another object of the invention is to provide an arm rest which can be swung from operative position to a concealed inoperative position within the rumble seat opening of an automobile.

Another object of the invention is to provide means for supporting the arm rest in operative position with minimum strain on the pivotal connections between the arm rest and the rain channel.

A still further object of the invention is the provision of means for adjusting the height of the arm rest.

Other objects of the invention will become apparent as the specification is proceeded with and considered in connection with the accompanying drawing, in which, Figure 1 is a plan view of an automobile having a rumble seat and arm rest according to the invention. Fig. 2 is an enlarged plan view of the arm rest as attached to the rain channel of the rumble seat. Fig. 3 is a sectional view on line 3—3 of Fig. 2, and Fig. 4 a side view of the universal attachment of the arm rest to the rain channel.

Referring more particularly to the drawing, A generally designates the improved arm rest device applied to the automobile 3. In the rumble seat type of automobile it is customary to provide a rain channel member 4, surrounding the seat opining 2, for the purpose of receiving a flange, not shown, which depends from a pivotally mounted top or closure member, also not shown. The device comprises a curved support or bracket member 5 secured to or forming part of an arm 6, the free end of which is connected to a short lever arm 7 for vertical swinging movement, by means of pivot pin 17. This lever arm 7 is in turn connected to a short bracket 8, for horizontal pivotal movement, by means of a pivot pin 9, which passes vertically through the bifurcated end 10 of the lever 7 and through an apertured ear 11, projecting laterally from the bracket 8. Any suitable means, such as screws 12, are employed to secure the bracket 8 to the bottom wall of the side members 13 of the rain channel 4. It will of course, be understood that two devices A will be employed, one at each side of the rumble seat opening. The member 5 supports an arm rest or cushion member 16 upon which the arm of the occupant of the rumble seat may be rested.

When in Figure 1, or operative position, the curved support or bracket member 5 is supported by means of a post or leg member 14, the upper curved end of which is secured to the inner face of the member 5, and the lower reduced end of which seats snugly within the channel 4. Adjustment of the member 5 to the desired height can be readily made by means of a screw 15, in an obvious manner. The post or leg member 14 in addition to supporting the member 5, serves to prevent downward and lateral stresses being communicated through the member 5 to the relatively weak lever 7 and arm 6.

To swing the curved support or bracket member 5 to inoperative or Figure 1 position, it is merely necessary to lift the post or leg member 14 out of the rain channel, and then let the member 5 drop down inside and to one side of the rumble seat opening, where it will not interfere with suit cases or other baggage. This movement is easily effected because of the universal joint connection previously described.

Having thus described my invention, What I claim, is:

1. In combination with an automobile having a rumble seat and a rain channel member therefor, a bracket member, a lateral extension of substantial length for said bracket member having its free end universally hinged to the said channel member, and supporting means on said bracket member closely fitting said channel member for seating said bracket member in said channel member and transferring lateral stresses on said bracket member to said channel member.

2. In combination with an automobile having a rumble seat and a rain channel member therefor, a bracket member hinged to the said channel member, supporting means on said bracket member closely fitting said channel member for lateral support of said bracket member, when seated in said channel member and adjusting means on said supporting means for adjusting the height of said supporting means.

3. In combination with an automobile having a rumble seat and a rain channel member therefor, a curved bracket member including a vertical and a horizontal portion, a lateral extension on said vertical portion, a universal joint connection between said lateral extension and said channel member, and supporting means on the central portion of said bracket member closely fitting said channel member for supporting said bracket member and transferring all stresses on said bracket member to said channel member.

4. An arm rest for an automobile having a rumble seat, comprising a curved bracket member including a vertical and a horizontal portion, means for pivotally connecting the bracket to the main channel of the rumble seat opening of the automobile, and a stiffening and supporting member fixed to said bracket member intermediate the vertical and horizontal portions thereof for reenforcing said bracket, said supporting member being adapted to seat its free vertical end in said main channel.

In testimony whereof I affix my signature.

FRED G. FOX.